US010067786B2

(12) United States Patent
Fu et al.

(10) Patent No.: US 10,067,786 B2
(45) Date of Patent: Sep. 4, 2018

(54) ASYNCHRONOUS SEQUENTIAL PROCESSING EXECUTION

(71) Applicant: Microsoft Technology Licensing, LLC, Redmond, WA (US)

(72) Inventors: Chen Fu, Cuptertino, CA (US); John Grant Bennett, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 169 days.

(21) Appl. No.: 15/171,979

(22) Filed: Jun. 2, 2016

(65) Prior Publication Data

US 2017/0351540 A1 Dec. 7, 2017

(51) Int. Cl.
*G06F 9/46* (2006.01)
*G06F 9/30* (2018.01)

(52) U.S. Cl.
CPC ............ *G06F 9/461* (2013.01); *G06F 9/3009* (2013.01)

(58) Field of Classification Search
None
See application file for complete search history.

(56) References Cited

U.S. PATENT DOCUMENTS 7,386,864 B2 6/2008 Richardson
7,529,867 B2 5/2009 McCrory et al.
7,640,538 B2 12/2009 Bennett et al.
8,069,439 B2 11/2011 Shukla et al.
9,043,796 B2 5/2015 Tillier
2005/0102681 A1 5/2005 Richardson
2009/0006520 A1 1/2009 Abib et al.
2013/0081023 A1 3/2013 Chang et al.
2014/0053157 A1 2/2014 Zhao et al.
2014/0282625 A1 9/2014 Chico de Guzman Huerta et al.
2015/0227362 A1 8/2015 Dvinsky et al.
2015/0347178 A1 12/2015 Magee et al.

OTHER PUBLICATIONS

"International Search Report and Written Opinion Issued in PCT Application No. PCT/US2017/034099", dated Aug. 30, 2017, 15 Pages.
Boyapati, et al., "Ownership Types for Safe Region-Based Memory Management in Real-Time Java", In Proceedings of the ACM SIGPLAN conference on Programming language design and implementation, Jun. 9, 2003, pp. 324-337.
Ousterhout, John, "Why Threads Are a Bad Idea (for most purposes)", In Proceedings of USENIX Technical Conference, Jan. 25, 1996, pp. 1-4.
Behren, et al., "Why Events Are a Bad Idea (for high-concurrency servers)", In Proceedings of the 9th conference on Hot Topics in Operating Systems, vol. 9, May 18, 2003, 6 pages.

(Continued)

*Primary Examiner* — Gregory A Kessler
(74) *Attorney, Agent, or Firm* — Holzer Patel Drennan

(57) ABSTRACT

The described technology provides a system and method for sequential execution of one or more operation segments in an asynchronous event driven architecture. One or more operation segments may be associated and grouped into an activity of operation segments. The operation segments of an activity may be sequentially executed based on a queue structure of references to operation segments stored in a context memory associated with the activity. Any initiated operation segment may be placed on the queue structure upon completion of an associated I/O action.

18 Claims, 7 Drawing Sheets

(56) References Cited

OTHER PUBLICATIONS

Taylor, et al., “Event-Driven Architecture: How SOA Enables the Real-Time Enterprise”, In Publication of Addison-Wesley Professional, Feb. 17, 2009, 1 page.
Erb, Benjamin, “Concurrent Programming for Scalable Web Architectures”, In Diploma Thesis of Institute of Distributed Systems, Ulm University, Apr. 2012, 13 pages.
Zhu, et al., “Microarchitectural Implications of Event-driven Server-side Web Applications”, In Proceedings of 2nd International Conference on Microelectronics, Circuits and Systems, Jul. 11, 2015, 13 pages.
Beltran, et al., “Evaluating the Scalability of Java Event-Driven Web Servers”, In International Conference on Parallel Processing, Aug. 15, 2004, 9 pages.
Welsh, Matt, “The Staged Event-Driven Architecture for Highly-Concurrent Server Applications”, In Ph.D. Thesis of Qualifying Examination Proposal, University of California Author: Matt Welsh, Dec. 2000, 20 pages.

ASYNCHRONOUS SEQUENTIAL PROCESSING EXECUTION

BACKGROUND

In server applications, processing client requests usually involves operations (e.g., CPU computations) and I/O actions. Two competing processing architectures in building a scalable server application include: (a) thread-per-request execution and (b) event-driven execution. In thread-per-request execution, one thread is assigned to execute all operations sequentially for processing a request received by the server application. This architecture is easier to construct and maintain due to widely understood sequential programming model. However, in thread-per-request execution, input/output (I/O) actions initiated by the executing operations block or stall thread processing until the initiated I/O actions upon which the thread depends are completed, after which the thread execution continues. As a result, this architecture requires the system to maintain a large amount of threads, which are resource intensive. In contrast, event-driven execution uses asynchronous I/O event handling to coordinate execution of operation groups used to process a received request. Systems constructed with architecture uses less number of threads as threads do not need to wait for I/O completion events. However, event-driven execution adds considerable programming complexity as the programmer has to manage the request handling as multiple operation groups that may run concurrently while coordinating asynchronous and potentially interdependent I/O and computation operations.

SUMMARY

In at least one implementation, the described technology provides a system for asynchronous sequential processing execution comprising a processor configured to execute operations for a requested activity implemented as one or more operation segments. Each of the operation segments may be executable to initiate at least one input/output (I/O) action. Each operation segment further includes an event handler that passes a reference to a next operation segment that is to be executed after completion of the one or more initiated I/O actions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

Figure 3:
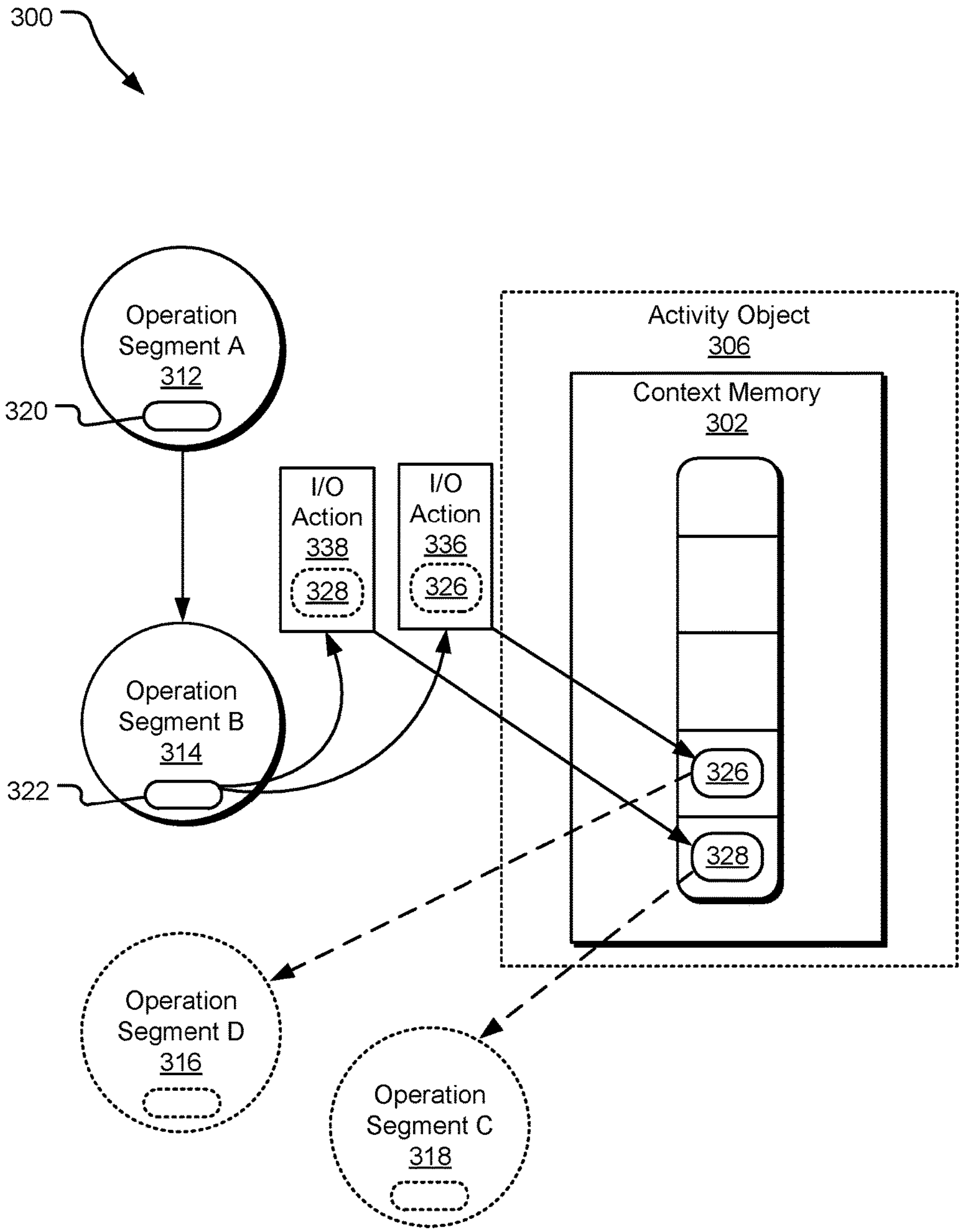

FIG. 3 further illustrates an example environment for asynchronous sequential execution.

Figure 4:
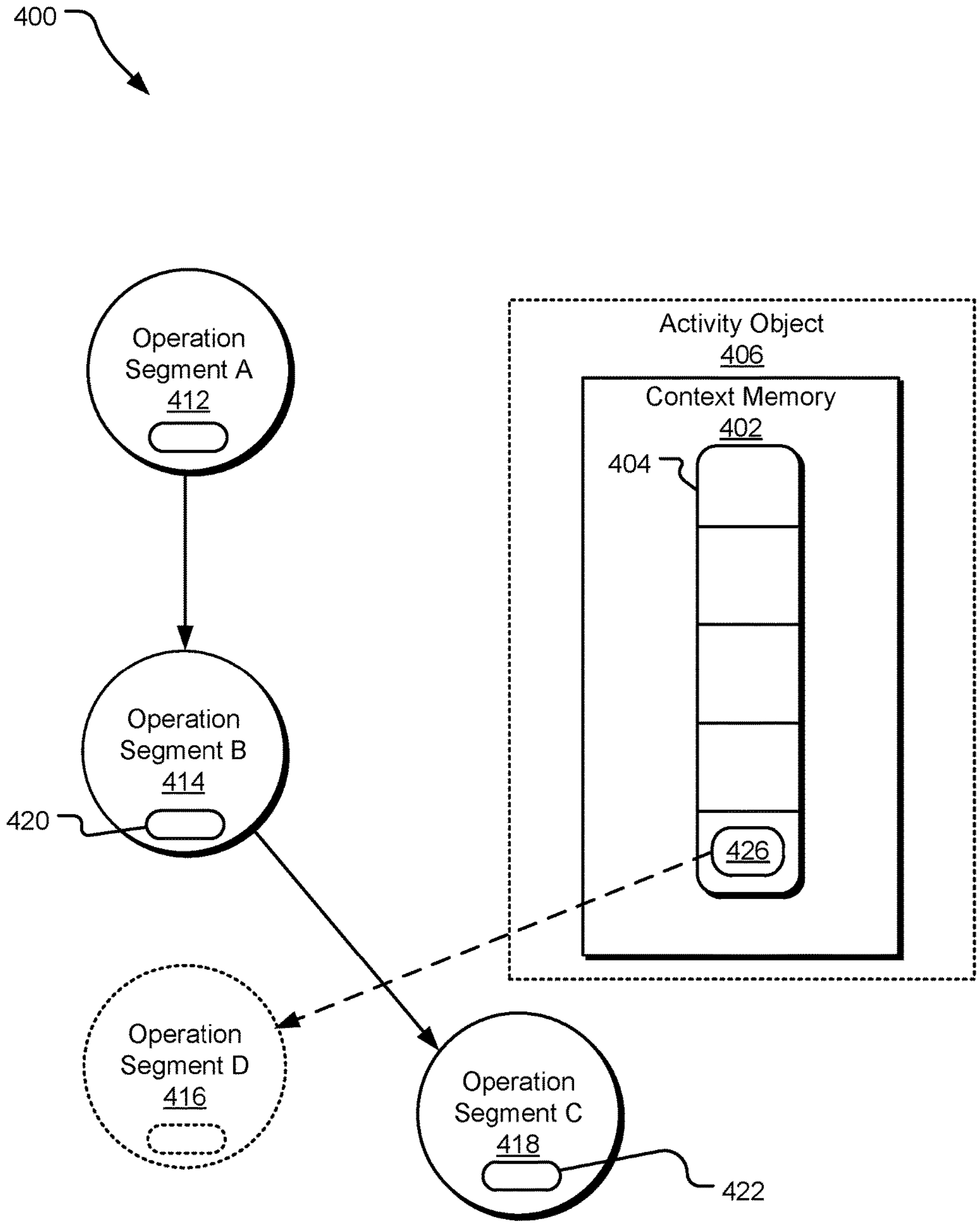

FIG. 4 further illustrates an example environment for asynchronous sequential execution.

Figure 5:
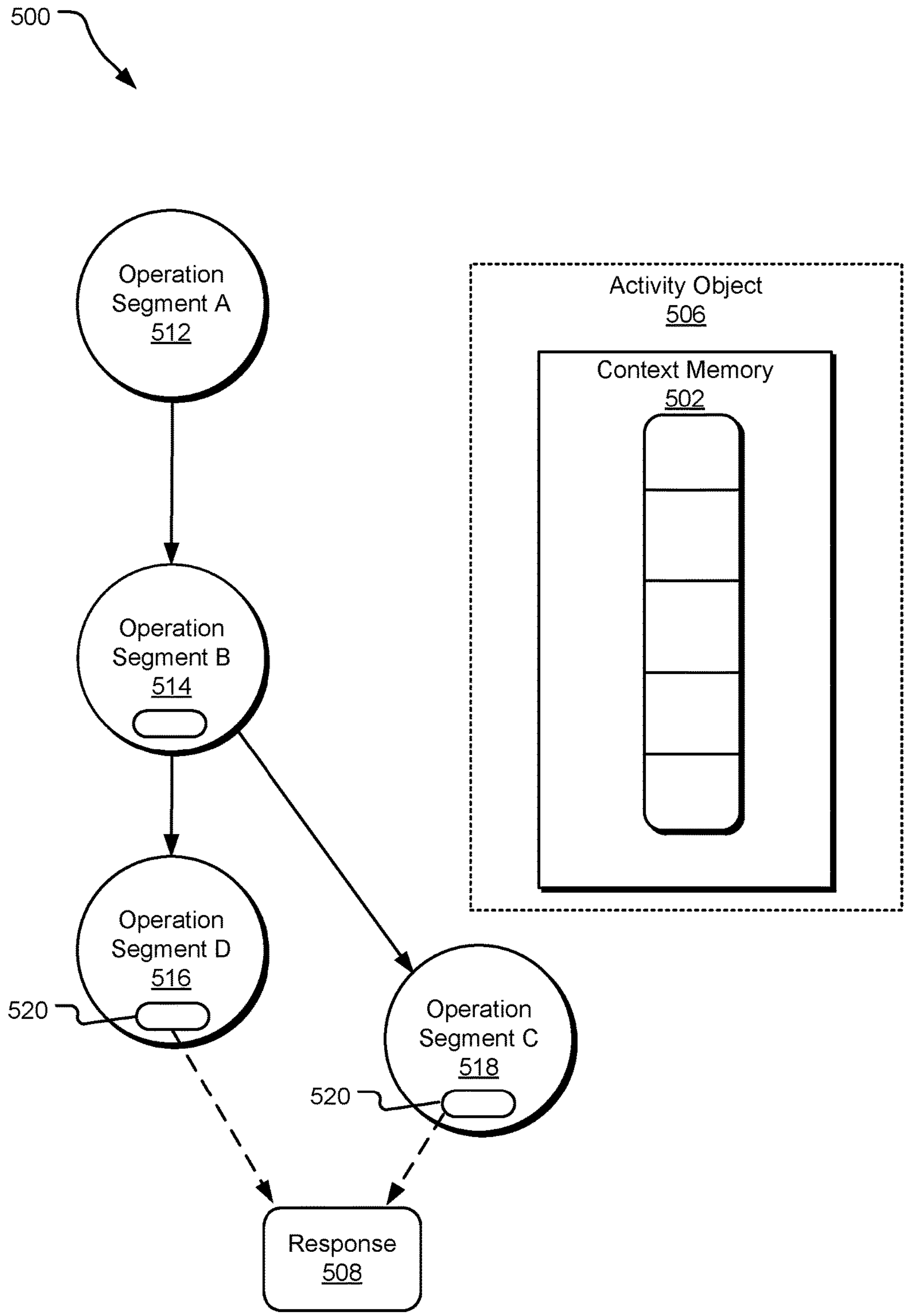

FIG. 5 further illustrates an example environment for asynchronous sequential execution.

Figure 6:
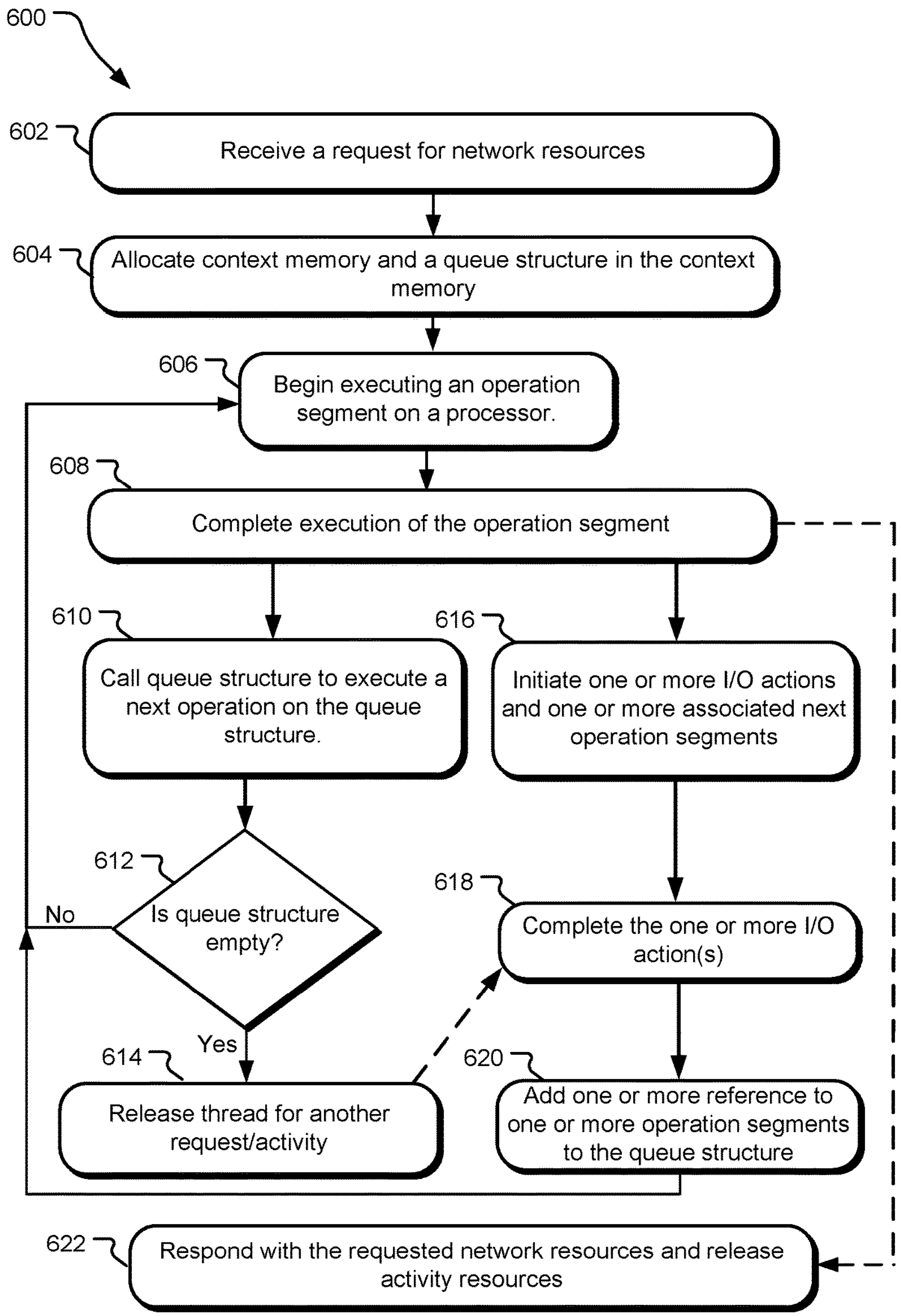

FIG. 6 illustrates example operations for asynchronous sequential execution.

Figure 7:
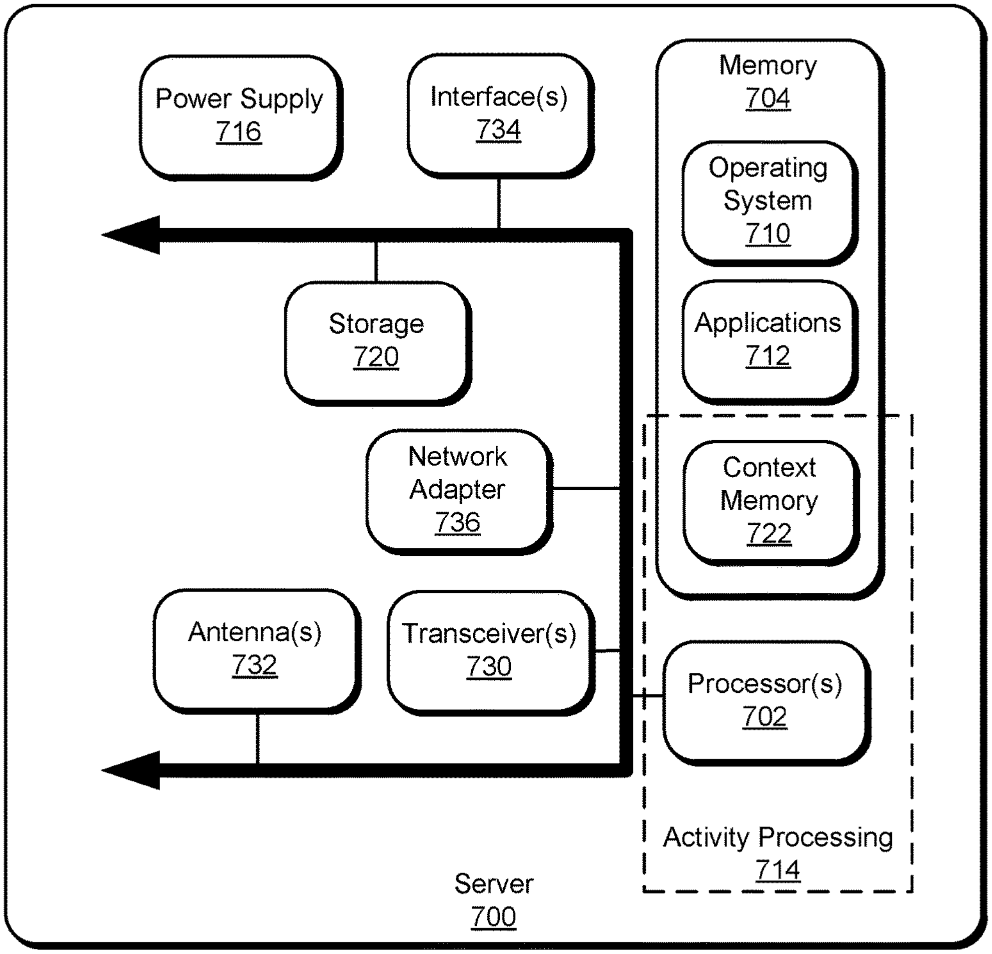

FIG. 7 illustrates an example system that may be useful in implementing the described technology

DETAILED DESCRIPTIONS

In thread-per-request execution, one thread is assigned to process one requested activity, generally resulting in sequential operation processing and avoiding concurrency complications and race conditions. All input/output (I/O) actions are synchronous to ensure the logic before and after an I/O action is executed on the same thread. As a result, a large number of threads are used to keep a processor of the server busy while some threads are awaiting completion of one or more I/O actions. Using a large number of threads can introduce a number of problems. First, threads are not resource inexpensive, because threads are allocated memory in user and/or kernel space. Second, since I/O action latencies are unpredictable, a percentage of threads that block thread processing while awaiting completion of an I/O action is difficult to predict, and thus, it can be difficult to tune the thread pool to control the processor usage in the server. Third, a large number of threads can lead to heightened processor contention when many threads are ready for execution (e.g., as associated I/O actions are completed), which involves operating system (OS) scheduling and context switching complexities.

In event-driven execution, asynchronous I/O actions offer higher thread efficiency but introduce substantial programming complexities. I/O actions may include without limitation I/O action initiations, I/O action completions, arrival of new activity requests, and custom events. When an I/O action is triggered, the current operation group is disabled and removed from the thread pool. A function callback associated with each I/O action can initiate a new operation group upon completion of the I/O action, such that the new operation group is executed in a thread obtained from the thread pool. In event-driven execution, a thread is not blocked (e.g., returned to the thread pool) while awaiting completion of an I/O action. As such, the system can keep the number of active threads small and can precisely control processor usage by tuning the thread pool size. Event driven approaches, however, are hard to program because operation groups of a single requested activity may be processed by multiple threads. Thus, a programmer maintains complex activity context to keep track of processing of each operation group associated with the requested activity. Further, multiple threads may try to modify a partial or intermediate operation result concurrently, resulting in race conditions. This complexity leads to higher development, maintenance, debugging, and enhancement cost.

Implementations described herein employ sequential associated operation segments (also referred to as "continuations") to process a "requested activity." For example, multiple operation segments may be executed in sequence to process a requested activity, with each operation segment initiating one or more I/O actions. A requested activity may be enabled or disabled at any particular time, depending on whether an associated operation segment is awaiting completion of an I/O action. An enabled activity is an activity having one or more of its operation segments executing in a thread (e.g., not disabled and awaiting completion of an I/O action). A disabled activity is an activity that does not have associated operation segments executing in any thread. In one implementation, the sequence of execution of associated operation segments is enforced by an event handler scheduling one or more "next" operation segments sequentially in a queue in context memory upon completion of a blocking I/O action, and by an operation segment, upon completion of execution, calling the "next" operation segment (in the sequence) to be executed from the queue. If no other next operation segment is in the queue, the thread may be returned to the thread pool and the activity disabled until the next operation segments is ready for execution after completion of the blocking I/O action.

When a requested activity is executed, operation segments for the requested activity are scheduled to run sequentially by registering the "next" operation segment in a queue of context memory. An operation segment of the requested activity is terminated after an event handler of the operation segment initiates one or more I/O actions and passes references to associated operation segments with the one or more I/O actions and after the event handler calls the next operation segment in the queue for execution. Note: After execution of the last operation segment in a sequence of operation segments for a requested activity, the last operation segment may terminate without initiating an I/O action or scheduling a next operation segment, returning the result of the requested activity to the requesting process.

In one implementation, the next operation segment indicated by the event handler is scheduled by storing a reference to the next operation segment in the queue of context memory in response to completion of an associated I/O action. Alternatively, if no other next operation segments are in the queue, the next operation segment indicated by the event handler can be executed immediately as the prior operation segment is terminated. The next operation segment can be executed in a new thread or in the thread that was previously processing the prior operation segment, depending on whether the prior thread is still available.

Figure 1:
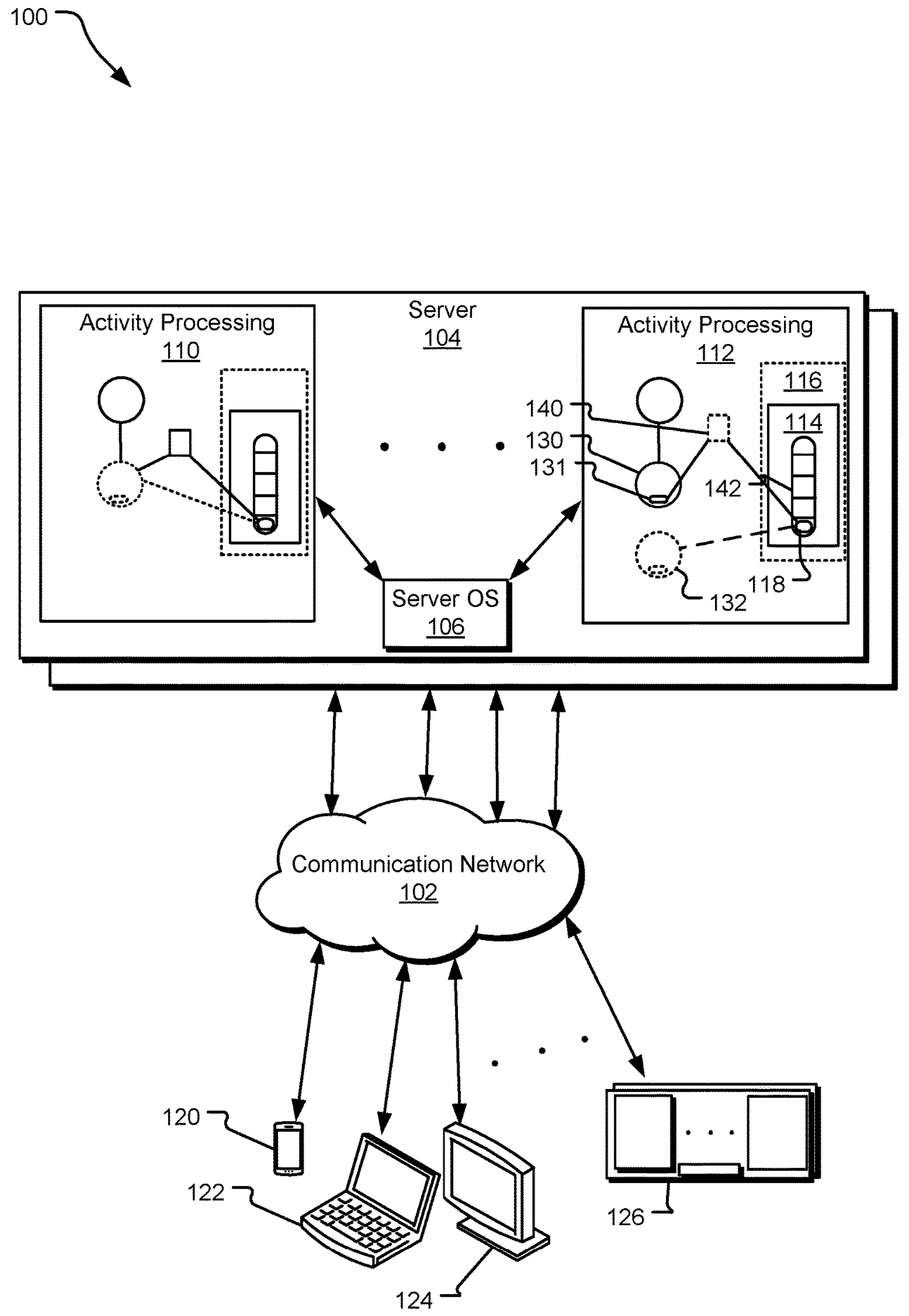
FIG. 1 illustrates an example environment for asynchronous sequential execution.

FIG. 1 illustrates an example environment 100 for asynchronous sequential execution. The environment 100 includes a communication network 102, a server 104, and a plurality of client devices (e.g., a mobile device 120, a laptop computer 122, a desktop computer 124, a second server 126). The communication network 102 facilitates communication between the client devices and the server 104. The server 104 may be configured to support requests from one or more applications that are executable on user devices (e.g., the mobile device 120, the laptop computer 122, the desktop computer 124) or may support requests from web browsers executing on the user devices. The server 104 may also support requests from another server (e.g., the second server 126). The requests may be requests for content such as videos, text, images, multimedia, audio files, documents, software, etc. The server 104 may be a web server or local server, and the communication network 102 may be by a wide-area network (WAN) such as the internet, local-area network (LAN) such as an intranet, or any other type of network.

A server, such as the server 104, may receive a large number of requests at any given time. In processing requests, a server accesses resources such as files, databases, and directories. The resources may be local (e.g., stored on the server 104) or remote (e.g., stored on other servers). If the resources required to process the request are stored remotely, the server 104 will issue any server-to-server requests that are necessary to process the request received from the client device(s). The server 104 may be a distributed system, and as such, different features of the server may be local or remote.

A server operating system 106 running on the server 104 manages the operations of the server 104 and may direct the requests received and initiate activity processing on one or more processors (not shown). Activity processing is illustrated by the boxes (e.g., activity processing 110 and 112.) The server 104 may be configured with one or more processors or processing cores for processing a single thread or a number of threads (e.g., multithreading). Threads may be used by one or more activities for processing requests The processors/processing cores may be general purpose, or they may be tailored for specific uses such as graphics processing, signal processing, floating-point arithmetic processing, encryption, I/O processing, and so on.

As a request is received, an activity may be created that includes one or more associated operation segments, and a context memory 114 may be allocated for processing the activity. When the activity is created, a queue structure 118 may be created as part of the activity and used for sequential execution of the one or more operation segments. The queue structure 118 may be represented as an array, vector, linked list, or other data structure The context memory 114 may further contain memory that stores temporary data used for processing or data for I/O actions. The context memory 114, as part of the activity, may keep track of I/O actions, I/O data, ready (and not ready) operation segments, operation segment instructions, etc. The activity may be created as an activity object (e.g., activity object 116) which may be used as a reference by I/O actions to queue associated operation segments on the queue structure 118 of the context memory. Furthermore, the activity object may be called by a terminating operation segment to initiate execution of a next operation segment referenced on the queue structure 118. In implementations, the activity object 116 may be a software object or module. In other implementations, the activity object 116 may be combination of software and circuitry.

The operation segments (e.g., the operation segments 130 and 132) are pieces of executable code that may be triggered as part of a request. The operation segments, when executed on a processor, may initiate or spawn an I/O action and/or another operation segment using an event handler that is part of the code of the operation segment. For example, an event handler 131 is part of operation segment 130. Further an initiated I/O action may be associated with another operation segment. For example, when operation segment 130 is finished executing, an I/O action 140 may be initiated and associated with one or more next operation segments (e.g., the next operation segment 132). For example, the I/O action 140 may be initiated, and a reference to the next operation segment 132 may be passed with the I/O action 140. The reference may be stored in a callback table (not shown). When the I/O action 140 is complete the reference may be passed to the end of the queue structure 118. Furthermore, the event handler 131 may call the queue structure 118 such that a next operation segment on the queue (e.g., at the head of the queue) may be retrieved for processing.

An I/O action (e.g., the I/O action 140) is a time consuming task that may not require CPU involvement, such as an I/O call, web service request, a request for limited resources that are not always immediately available or a combination of two or more I/O actions. As I/O actions are completed (e.g., the arrival of data from resources of the server 104), the I/O actions pass the associated reference to a next operation segment for placement in the queue structure 118. The operation segments (e.g., the operation segment 132) may be executed in an order as placed on the queue structure 118 (e.g., first in first out (FIFO) sequence). Further, if I/O action is complete and the queue structure is empty, then the associated operation segment may be immediately executed on the processor. Thus, before placing a reference to an operation segment on the queue structure, the activity object 116 may check to see whether the queue structure 118 is empty. If the queue structure 118 is empty, the activity object 116 initiates execution of the operation segment. If the queue structure 118 is not empty, the operation segment will be placed last in the queue structure 118.

The initiation of an activity with data structures and processes for grouping associated operation segments (e.g., the operation segments 130 and 132) into the activity and using a I/O actions to sequence next operation segments into a queue operates to allow operation segments to execute sequentially. The sequential operation minimizes the risk of race conditions that may cause bugs in programs. Moreover, this structure and method uses processor more efficiently such that requests for network resources may be processed quickly. Because a server (e.g., the server 104) may receive hundreds to hundreds of thousands of requests in a given second client devices may operate more efficiently. Furthermore, a programmer that designs applications that use servers, may be able to use the above described structure to program more efficiently.

Figure 2:
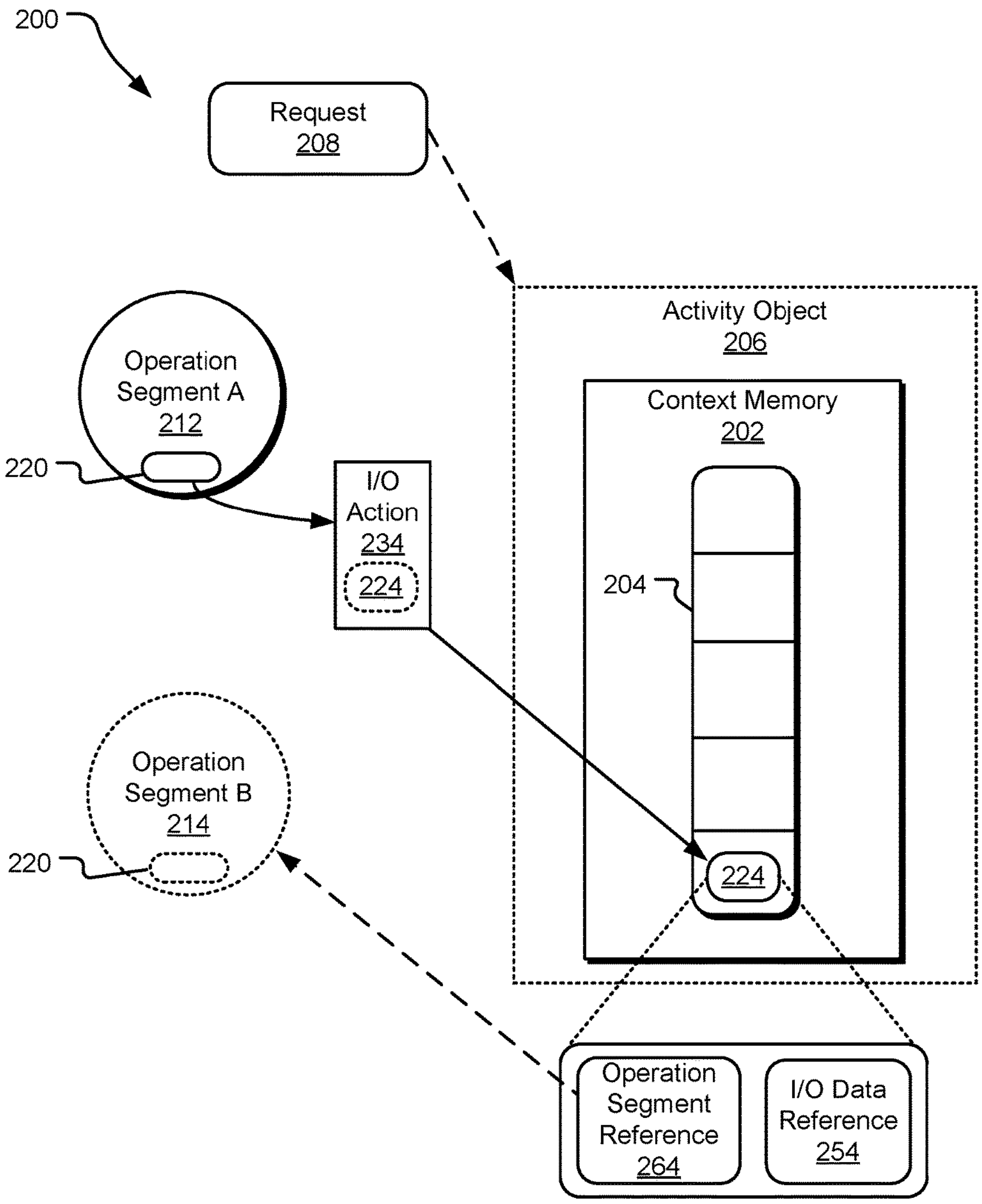
FIG. 2 illustrates another example environment for asynchronous sequential execution.

FIG. 2 illustrates another example environment 200 for asynchronous sequential execution. Specifically, FIG. 2 illustrates an expanded view of activity processing on a server as illustrated and discussed above with respect to FIG. 1. The environment 200 includes an activity object 206 and a context memory 202 that includes a queue structure 204. A request 208 may be received from a server operating system (OS) on the server, which received the request from one or more client devices or another server via a communication network. The request 208 may include a request for network resources and/or processing. The request 208 may include one or more operation segments that are associated in an activity.

In processing the request 208 an activity object 206 may be initialized with an allocation of a context memory 202 including the queue structure 204, The activity object 206 may be used as a reference for the queue structure 204 and context memory 202, such that operation segments may be placed on the queue structure 204 and I/O data may be stored in the context memory 202. The request 208 may post the first operation segment (e.g., operation segment A 212) for execution on one or more processors. Once execution of the operation segment A 212 is complete, an event handler 220 of the operation segment A 212 may initiate an input/output (I/O) event 234 with an associated reference (e.g., an operation segment reference 224) to a next operation segment B 214. If the queue is empty (e.g., no more operation segments are ready for execution), the activity may be disabled, and the thread/processing resources may be released for use by another activity for processing a different request.

Once the I/O action 234 is complete, the reference to the next operation segment 264 is passed to the queue structure 204 of the context memory 202. The reference 224 may include a next operation segment reference 264, which is a reference to the next operation segment B 214. The reference 224 may also contain an I/O data reference 254 that was received from the associated I/O action 234. If the queue structure is empty (e.g., the activity is disabled) when a new reference is added to the queue. Then the activity will be enabled, because the operation segment associated with the new reference is ready for execution. Thus, the activity will be released to a thread pool for execution. If additional operation segments are ready for execution before execution on the activity commences, then the references will be added to the queue and will be executed in a sequential manner.

A plurality of references (e.g., the reference 224) may be stored on the queue structure 204 of the context memory 202. The plurality of references may be placed in an order in which an associated I/O action (e.g., I/O action 234) is completed. Once execution of an operation segment (e.g., operation segment A 212) is complete, the event handler (e.g., event handler 220) may call the queue structure 204 (via the activity object 206) such that a next operation segment on the queue structure 204 (e.g., at the head of the queue structure) may be executed. As such, any operation segments (e.g., operation segment A 212 and operation segment B 214) may be executed sequentially. Further, the activity object 206 may determine whether the queue structure 204 is empty before the reference 224 to the next operation segment B 214 is placed on the queue structure 204. If the queue structure 204 is empty, then the next operation segment may be immediately executed (or the activity may be "enabled"). Once an operation segment is executed, its reference is removed from the queue structure 204 of the context memory 202.

It should be understood that a plurality operation segments and a plurality of I/O actions may be initiated by an executed operation segment. The queue structure 204 may be dynamically receiving references to operation segments and references may be continually removed such that associated operation segments may be executed.

I/O actions (e.g., I/O action 234) may be handled by an I/O library which communicates with the activity object 206 and/or the queue structure 204. The queue structure 204 may contain references (e.g., the reference 224) which contains pointers to the operation segment instructions (e.g., operation segment reference 264 is a pointer to the instructions for the operation segment B 214, which may be stored in the context memory 202) and a pointer to the I/O data (e.g., I/O data reference 254 is a pointer to the I/O data which is stored in the context memory 202).

FIG. 3 further illustrates an example environment 300 for asynchronous sequential execution. Specifically, FIG. 3 illustrates a continuation of the environment illustrated in FIG. 2 after completion of execution of an operation segment B 314 (e.g., operation segment B 214 in FIG. 2). The environment 300 includes an activity object 306 and a context memory 302 that includes a queue structure 304. An operation segment A 312 has been executed and has initiated (e.g., via an event handler 320) an I/O action (not shown) that was associated with the operation segment B 314. A reference (e.g., reference 224 in FIG. 2) was called and operation segment B 314 was retrieved for execution.

After execution of operation segment B 314, an event handler 322 of operation segment B 314 initiates an I/O action 336 and an I/O action 338. Further, the event handler 322 may pass references to associated next operation segments (e.g., references 326 and 328) with the I/O actions 336 and 338. Upon completion of I/O actions 336 and 338, the references 326 and 328 to associated operation segments 316 and 318 are passed to the queue structure 304 of the context memory 302. For example, I/O action 338 may be associated with operation segment C 318 (e.g., the I/O action 338 must be completed before the operation segment C 318 may be executed). The operation segment C 318 is referenced by the reference 328. The I/O action 336 may be associated with operation segment D 316, which is referenced by the reference 326. In this example, the I/O action 338 is completed before the I/O action 336. Thus, the reference 328 is placed in the queue before the reference 326.

As discussed above with respect to FIG. 2, the activity object 306 may be used as a reference such that the queue may be accessed and references passed. Furthermore, the activity object 306 may be used as a reference and called by event handlers of terminating operation segments (e.g., operation segments completing execution) such that a next operation segment (e.g., an operation segment reference at the head of the queue) may be retrieved for execution. It should be understood that a plurality of I/O actions may be associated with a single operation segment.

In implementations, a single I/O action may be associated with more than one operation segment. Thus, placement of a reference of a single operation segment, into the queue structure 304 may be dependent upon more than one I/O action. Furthermore, completion of a single I/O action may trigger placement of more than one reference to next operation segments into the queue structure 304.

The instructions for an operation segment may be stored in the context memory 302, such that a reference may point to the instructions for the operation segment (e.g., reference 326 points to instructions for operation segment D 316 stored in context memory 302.) Thus, the instructions may be retrieved once the operation segment is ready for execution. Further, the context memory 302 may contain any I/O data that is associated with the next operation segment(s) (e.g., data received from I/O action 336 may be stored in the context memory 302). As such, the reference 326 may contain a pointer to the I/O data associated with operation segment D 316. The I/O data may be retrieved from the context memory 302 once the associated operation segment is ready for execution.

As an activity of related operation segments (e.g., operation segment A 312, operation segment B 314, operation segment C 318, and operation segment D 316) is being processed, the activity may switch from being enabled (e.g., one or more references to operation segments are on the queue and thus are ready for execution) to disabled (the queue is empty and thus no operation segments are ready for execution) as operation segments are initiated, I/O actions are completed, and operation segments are executed and references are removed from the queue. If an activity is disabled, a thread that the activity was using for processing may be released to a thread pool such that another activity may use the thread. When the activity is enabled, a thread may be retrieved from the thread pool and used by the activity for processing the request. Further, the context memory 302 is continually allocated as the activity of operation segments is being processed. The context memory may not be released until all operation segments of an activity/request are executed.

FIG. 4 further illustrates an example environment 400 for asynchronous sequential execution. Specifically, FIG. 4 illustrates a continuation of the environment illustrated in FIG. 3 after completion of execution of an operation segment C 418 (e.g., operation segment C 318 in FIG. 3). The environment 400 includes an activity object 406 and a context memory 402 that includes a queue structure 404. In environment 400, operation segment A 412 was previously executed. Execution of operation segment A 412 initiated operation segment B 414, which was also previously executed (as described above with respect to FIG. 3). Operation segment B 414 initiated operation segments C and D 418 and 416 using event handler 420. In this illustration, operation segment C 418 has been executed, and thus a reference to operation segment C (e.g., reference 328 in FIG. 3) has been removed from the queue, leaving only a reference 426 to the operation segment D 416 on the queue. Operation segment C has an event handler 422 which may initiate a next operation segment, and I/O action, or a response.

A previously executed operation segment may call the queue structure 404 such that the first operation segment reference may be retrieved and the referenced operation segment may be executed. For example, after operation segment 414 is finished executing, an event handler 420 of operation segment B 414 may call the queue structure 404 (via the activity object 412). In response, operation segment C may be executed because its reference was first in the queue structure 404. Once the operations and associated I/O data are retrieved for execution, the reference 426 may be removed from the queue structure 404 of the context memory 402. Any associated I/O data may also be removed from the context memory 402 upon execution of the operation segment.

FIG. 5 further illustrates an example environment 500 for asynchronous sequential execution. Specifically, FIG. 5 illustrates a continuation of the environment illustrated in FIG. 4 after completion of execution an operation segment D 416 (e.g., operation segment C 418 in FIG. 4). The environment 400 includes an activity object 406 and a context memory 402 that includes a queue structure 404. In environment 400, operation segment A 412 has been previously executed and initiated operation segment B 414, which has also been previously executed (as described above with respect to FIG. 3). Further, as described above with respect to FIG. 4, operation segment C 518 (e.g., operation segment C 418 in FIG. 4) has been previously executed.

In this illustration, the operation segment C 518 and operation segment D 516 may be considered the final operation segments of an activity of associated operation segments. Thus, the queue structure 504 of the context memory 502 is empty. The operation segments C 518 and D 516 may send the results of their executions out as a response 508. The response 508 may be the response to an original request for network resources. The response 508 may be sent via event handlers (e.g., event handlers 522 and 524) of the operation segments C 518 and D 516.

Upon completion of an activity of operation segments (e.g., operation segments A 512, B 514, C 518, and D 516) the resources, such as context memory 502 and queue structure 504, processors, may be released for use by another activity of the same request or a different request.

The following is an example implementation of the asynchronous sequential architecture implemented in C++. It should be noted that "operation segments," as described throughout the specification, are referred to as "continuations" and "callbacks" in the following code and description/comments:

```
class Disposable
{
public:
    virtual void Dispose( ) = 0;
};
template <typename T>
class Callback
{
public:
    // Dispatch the callback
    //
    void Post(T& arg, uint32_t microsecDelay = 0);
    // Define actual work in this method;
    //
    virtual void OnReady(ParameterT& arg) = 0;
```

-continued

```
};
template <typename ContextT, typename T>
class Continuation : public Callback<T>, Disposable
{
public:
    // A continuation (e.g., operation segment) should belong to an
    activity and //should be created using Activity::CreateContinuation
    //
    Continuation(Activity<ContextT>& parent);
    Activity& GetActivity( );
    ContextT& GetContext( );
    void Dispose( ) override { this->~Continuation( ); }
};
// Activity ensures all its continuation instances are executed
sequentially
//
template <typename ContextT>
class Activity
{
public:
    template <typename ContinuationT, typename... _Types>
    ContinuationT& CreateContinuaiton(_Types&&... _args);
    // Terminate Activity, dispose all continuations and registered
    disposables
    //
    void Shutdown(errno_t status);
};
```

The following is an example where there is an asynchronous function "foo," which queries a distributed database. The function needs an activity that sends multiple queries and aggregates the results.

void foo(Key key, Callback<Result>& completion);

A context type is where a partial result is tracked. The two continuations are, FanOut, which send out multiple queries, and FanIn, which aggregates the results.

```
struct Context
{
    std::vector<Result> results;
    size_t remains;
};
class FanIn: public Continuation<Context, Result>
{
 public:
    void OnReady(std::Result& arg) override
    {
        auto context = GetContext( );
        context.results.push_back(arg);
        context.remains --;
        if (context.remains > 0)
        {
            // a barrier here, only proceed when all results are returned
            ;
        }
    // code for aggregating results
    GetActivity( ).Shutdown(S_OK);
    }
}
class FanOut: public Continuation<Context, std::vector<Key>>
{
public:
    void OnReady(std::vector<Key>& arg) override
    {
        auto context = GetContext( );
        context.remains = arg.size( );
        FanIn& aggregator = GetActivity( ).CreateContinuation<FanIn>(
        );
        for (auto& key: arg)
        {
            foo(key, aggregator);
        }
    }
};
// main operation segment to start the processing.
void process(std::vector<Key>& arg)
```

-continued

```
{
    Activity<Context>& job = ActivityFactory<Context>( );
    auto fanout = job.CreateContinuation<FanOut>( );
    fanout.Post(arg);
}
```

In this example, the context data structure is initialized when the activity is created, and destroyed when the activity is finished. The programmer need not maintain the context or manually pass it to different continuations/operation segments. Nor does the programmer need to explicitly manage concurrent access to the context. As shown in the "FanIn" operation segment, a barrier can be implemented without using lock or any other operation that may cause a CPU stall. The queue structure is represented by an activity vector.

The "onReady" methods are placeholders where the programmers may define operation segments. The onReady methods, as part of the activity object, may call the next operation segment on the queue (e.g., at the head of the queue) for execution. Furthermore, the "Post" functions may be used to queue next operation segments on the queue structure. Note: there are two types of Post functions. There is an explicit Post which may be used to explicitly post an operation segment on the queue structure and a callback Post which may be used to post operation segments on the queue structure as I/O actions are completed. The Activity class defines the activity object. In the main operation, an instance of an activity object is created.

It should be understood that the process described can be implemented in other programming languages other than C++. The process will be executed by a processor, that reads processor readable instructions (e.g., the instructions provided above compiled to processor readable instructions). As such, the implementations can be described in different levels of abstraction such as machine language, programming languages, applications, and operating system levels of abstraction.

The implementations are described herein with respect to a server. However, it should be noted that the features and processes could be implemented on a device (e.g., such as a mobile device or desktop computer).

FIG. 6 illustrates example operations 600 for asynchronous sequential execution. The operations may take place on one or more processors and utilize local and/or remote memory of a server. A receiving operation 602 receives a request for network resources. The request may include one or more operation segments for processing the request. In response to receiving the request, allocating operation 604 allocates context memory and a queue structure in the context memory. The context memory and queue structure may be referred to as an activity object. A beginning operation 608 begins execution of an operation segment on a processor. If the operation segment is the first operation segment of the request, then the operation segment is posted for execution. A completing operation 608 completes execution of the operation segment. In response to completion of execution of the operation segment an initiate operation 616 initiates one or more I/O actions and one or more references to associated next operation segments. References to the one or more next operation segments may be passed with the initiated one or more I/O actions. A completing operation 618 completes the one or more I/O actions. In response to the completing operation 618, an adding operation 620 adds the one or more references to one or more operation segments to the queue structure. The adding operation 620 may be achieved by the I/O action calling the queue structure (via the activity object) with the previously passed reference to the next operation segment. I/O data associated with the completing operation 618 may be stored in the context memory such that the I/O data may be retrieved upon execution of the operation segment. If the queue structure is empty upon adding operation 620, the operation segment referenced by the reference may be immediately executed.

Also in response to the completing operation 608, a calling operation 610 (via an event handler of the operation segment) calls the queue structure such that a next operation segment referenced on the queue structure may be executed (e.g., the reference at the head of the queue). A determining operation 612 determines whether the queue structure is empty. If the queue structure is not empty, the next operation segment is retrieved for execution, and the beginning operation 606 begins execution of the retrieved operation segment. To execute the retrieved operation segment, instructions and I/O data for the operation segment may be retrieved from the context memory. If the queue structure is empty, a thread that is being used by the operation segment is released for use by another request/activity in a releasing operation 614. The activity then awaits completion of I/O actions (via completing operation 618) such that associated operation segments may be executed.

After the operation segments are done executing (e.g., the activity of operation segments is finished executing via the completing operation 608), a responding operation 622 may respond with the requested network resources and activity resources may be released (e.g., the context memory).

FIG. 7 illustrates an example system (labeled as a server 700) that may be useful in implementing the described technology. The server 700 includes one or more processor(s) 702, a memory 704. The memory 704 generally includes both volatile memory (e.g., RAM) and non-volatile memory (e.g., flash memory). An operating system 710 resides in the memory 704 and is executed by the processor 702.

One or more application programs 712 modules or segments, such as a server operating system, applications, activity objects, event handlers, queue structures, operation segments, sequence handlers, or I/O handlers may be embodied by instructions and are loaded in the memory 704 and/or storage 720 and executed on the by the processor 702. For example, the code discussed above with respect to FIG. 5 may be stored on the memory 704 and executed by the processor 702. For example, one or more processors 702 and a portion of memory 704 (e.g., a context memory 722) may be allocated to process and execute an activity of related operation segments. I/O data, results, references, data, etc. may be stored in the memory 704 or storage 720 and may be retrievable by the processor 702 for processing requests or other operations. This allocated memory and/or the one or more processors 702 may be referred to as activity processing 714. The storage 720 may be local to the server 700 or may be remote and communicatively connected to the web-server 700 and may include another server. The storage 720 may store resources that are requestable by client devices (not shown).

The server 700 includes a power supply 716, which is powered by one or more batteries or other power sources and which provides power to other components of the server 700. The power supply 716 may also be connected to an external power source that overrides or recharges the built-in batteries or other power sources.

The server 700 may include one or more communication transceivers 730 which may be connected to one or more antenna(s) 732 to provide network connectivity (e.g., mobile phone network, Wi-Fi®, Bluetooth®, etc.) to one or more other servers and/or client devices (e.g., mobile devices, desktop computers, or laptop computers). The server 700 may further include a network adapter 736, which is a type of communication device. The server 700 may use any the adapter and any other types of communication devices for establishing connections over a wide-area network (WAN) or local-area network (LAN). It should be appreciated that the network connections shown are exemplary and that other means of and communications devices (e.g., a modem or router) for establishing a communications link between the server 700 and other devices may be used.

The server 700 may include one or more input devices 734 such that a user may enter commands and information (e.g., a keyboard or mouse). These and other input devices may be coupled to the server by one or more interfaces 738 such as a serial port interface, parallel port, universal serial bus (USB), etc.

The server 700 may include a variety of tangible computer-readable storage media and intangible computer-readable communication signals. Tangible computer-readable storage can be embodied by any available media that can be accessed by the server 700 and includes both volatile and nonvolatile storage media, removable and non-removable storage media. Tangible computer-readable storage media excludes intangible communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the server 700. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

An example system for performing processor executable instructions includes an activity object initialized in response to receiving a request, the activity object including a context memory and a queue structure of the context memory. The system further includes an operation segment configured to initiate at least one input/output (I/O) event, add a reference to a next operation segment to the queue structure of the context memory upon completion of the at least one I/O action, and initiate execution of an operation segment at the head of the queue structure of the context memory.

Another example system of any preceding system includes the operation segment being further configured to determine whether the queue structure is empty before adding the reference to the next operation segment and wherein the next operation segment is executed in response to determining that the queue structure is empty.

Another example system of any preceding system includes the activity object being disabled if the queue structure is empty. Disabling the activity corresponds to releasing a thread to a thread pool.

Another example system of any preceding system includes the activity object being enabled in response to adding the reference to the next operation segment in the queue structure of the context memory. Enabling the activity corresponds to retrieving a thread from a thread pool to execute the operation segment.

Another example system of any preceding system includes the context memory storing I/O data associated with the at least one I/O action, the I/O data being retrieved upon execution of the next operation segment.

Another example system of any preceding system includes the context memory and the queue structure of the context memory being released when a response is issued by a final operation segment of the activity object.

One or more tangible processor-readable storage media embodied with instructions for executing on one or more processors and circuits of a device an example process for asynchronous sequential execution, the example process includes initializing an activity object in response to receiving a request, the activity object including a context memory and a queue structure of the context memory. The example process further includes initializing an I/O action associated with execution of an operation segment, the operation segment providing a reference to a next operation segment associated with completion of the I/O action. The example process further includes adding the reference to the next operation segment to the queue structure of the context memory in response to completing the I/O action. The example process further includes executing an operation segment at the head of the queue structure.

Another one or more tangible processor-readable storage media of any preceding processor-readable storage media includes instructions for executing on one or more processors and circuits of a device an example process for asynchronous sequential execution, wherein executing an operation segment at the head of the queue structure further includes initializing a second I/O action and providing a reference to a second operation segment associated with completion if the second I/O action.

Another one or more tangible processor-readable storage media of any preceding processor-readable storage media includes instructions for executing on one or more processors and circuits of a device an example process for asynchronous sequential execution, wherein adding the reference to the next operation segment to the queue structure of the context memory in response to completing the I/O action further includes storing the I/O data of the completed I/O action to the context memory.

Another one or more tangible processor-readable storage media of any preceding processor-readable storage media includes instructions for executing on one or more processors and circuits of a device an example process for asynchronous sequential execution, wherein the I/O data is retrieved upon execution of the next operation segment.

Another one or more tangible processor-readable storage media of any preceding processor-readable storage media includes instructions for executing on one or more processors and circuits of a device an example process for asynchronous sequential execution, wherein the next operation segment is executed if the queue structure of the context memory is empty before adding the reference to the next operation segment to the queue structure of the context memory.

An example method for asynchronous sequential execution includes initializing an activity object in response to receiving a request, the activity object including a context memory and a queue structure of the context memory, initializing an I/O action associated with execution of an operation segment, the operation segment providing a reference to a next operation segment associated with completion of the I/O action adding the reference to the next operation segment to the queue structure of the context memory in response to completing the I/O action; and executing an operation segment referenced at the head of the queue structure.

Another example method of any preceding method includes executing the operation segment further including initiating a second I/O action and a second operation segment associated with the second I/O action and wherein a reference to the second operation segment is added to the queue structure of the context memory upon completion of the second I/O action.

Another example method of any preceding method includes executing the operation segment referenced at the head of the queue structure further includes further includes retrieving I/O data associated with the operation segment and instructions for the operation segment from the context memory.

Another example method of any preceding method includes determining whether the queue structure in the context memory is empty before storing the one or more references in the queue structure.

Another example method of any preceding method includes the operation segment referenced at the head of the queue structure being the next operation segment.

Another example method of any preceding method includes disabling the activity object if the queue structure is empty, wherein disabling the activity object corresponds to releasing a thread to a thread pool.

Another example method of any preceding method includes enabling the activity object in response to adding a reference to an operation segment in the queue structure of the context memory, wherein enabling the activity object corresponds to retrieving a thread from a thread pool.

Another example method of any preceding method includes responding to a request for network resources upon execution of all operation segments of the request.

Another example method of any preceding method includes releasing the context memory for use by a second request.

An example system includes means for initializing an activity object in response to receiving a request, the activity object including a context memory and a queue structure of the context memory. The example system further includes means for initializing an I/O action associated with execution of an operation segment, the operation segment supporting means to provide a reference to a next operation segment associated with completion of the I/O action. The system further includes means for adding the reference to the next operation segment to the queue structure of the context memory in response to completing the I/O action, and executing an operation segment referenced at the head of the queue structure.

Another example system of any preceding system further includes means for initiating a second I/O action and a second operation segment associated with the second I/O action. The example system further includes support for adding a reference to the second operation segment to the queue structure of the context memory upon completion of the second I/O action.

Another example system of any preceding system further includes means for retrieving I/O data associated with the operation segment and instructions for the operation segment from the context memory in support of adding the reference to the next operation segment to the queue structure of the context memory in response to completing the I/O action.

Another example system of any preceding system further includes means for determining whether the queue structure in the context memory is empty before storing the one or more references in the queue structure.

Another example system of any preceding system further includes support for the operation segment referenced at the head of the queue structure being the next operation segment.

Another example system of any preceding system further includes means for disabling the activity object if the queue structure is empty, and releasing a thread to a thread pool.

Another example system of any preceding system further includes means for enabling the activity object in response to adding a reference to an operation segment in the queue structure of the context memory, and retrieving a thread from a thread pool.

Another example system of any preceding system further includes means for responding to a request for network resources upon execution of all operation segments of the request.

Another example system of any preceding system further includes means for releasing the context memory for use by a second request.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A system for performing processor executable instructions comprising:

one or more processors;

an activity object initialized by the one or more processors in response to receiving a request, the activity object allocating a context memory and including a queue structure stored in the context memory; and an operation segment configured to initiate at least one input/output (I/O) action, add a reference to a next operation segment to the queue structure of the context memory upon completion of the at least one I/O action, and initiate execution, by the one or more processors, of an operation segment at a head of the queue structure of the context memory, execution of the operation segment at the head of the queue structure initializing at least a second I/O action and adding a reference to a second operation segment associated with completion of at least the second I/O action to the queue structure of the context memory.

2. The system of claim 1 wherein the operation segment is further configured to determine whether the queue structure is empty before adding the reference to the next operation segment, the next operation segment being executed in response to determining that the queue structure is empty.

3. The system of claim 1 wherein the activity object is disabled responsive to determining that the queue structure is empty, disabling the activity corresponds to releasing a thread to a thread pool.

4. The system of claim 1 wherein the activity object is enabled in response to adding the reference to the next operation segment in the queue structure of the context memory, enabling the activity corresponds to retrieving a thread from a thread pool to execute the operation segment.

5. The system of claim 1 wherein the context memory stores I/O data associated with the at least one I/O action, the I/O data being retrieved upon execution of the next operation segment.

6. The system of claim 1 wherein the context memory and the queue structure of the context memory are released when a response is issued by a final operation segment of the activity object.

7. One or more tangible processor-readable storage media embodied with instructions for executing on one or more processors and circuits of a device a process for asynchronous sequential execution, the process comprising:

initializing an activity object in response to receiving a request, the activity object allocating a context memory and including a queue structure stored in the context memory;

initializing an I/O action associated with execution of an operation segment, the operation segment providing a reference to a next operation segment associated with completion of the I/O action;

adding the reference to the next operation segment to the queue structure of the context memory in response to completing the I/O action; and executing an operation segment at a head of the queue structure, execution of the operation segment at the head of the queue structure initializing at least a second I/O action and adding a reference to a second operation segment associated with completion of at least the second I/O action to the queue structure of the context memory.

8. The one or more tangible processor-readable storage media of claim 7 wherein adding the reference to the next operation segment to the queue structure of the context memory in response to completing the I/O action further comprises:

storing I/O data of the completed I/O action to the context memory.

9. The one or more tangible processor-readable storage media of claim 8 wherein the I/O data is retrieved upon execution of the next operation segment.

10. The one or more tangible processor-readable storage media of claim 7 wherein the next operation segment is executed responsive to determining that the queue structure of the context memory is empty before adding the reference to the next operation segment to the queue structure of the context memory.

11. A method for asynchronous sequential execution, the method comprising:

initializing an activity object in response to receiving a request, the activity object allocating a context memory and including a queue structure stored in the context memory;

initializing an I/O action associated with execution of an operation segment, the operation segment providing a reference to a next operation segment associated with completion of the I/O action;

adding the reference to the next operation segment to the queue structure of the context memory in response to completing the I/O action; and executing an operation segment referenced at a head of the queue structure, execution of the operation segment at the head of the queue structure initializing at least a second I/O action and adding a reference to a second operation segment associated with completion of at least the second I/O action to the queue structure of the context memory.

12. The method of claim 11 wherein executing the operation segment referenced at the head of the queue structure further comprises:

retrieving I/O data associated with the operation segment and instructions for the operation segment from the context memory.

13. The method of claim 11 further comprising:

determining whether the queue structure in the context memory is empty before adding the reference to the next operation segment to the queue structure.

14. The method of claim 11 wherein the operation segment referenced at the head of the queue structure is the next operation segment.

15. The method of claim 11 further comprising:

disabling the activity object responsive to determining that the queue structure is empty, disabling the activity object corresponds to releasing a thread to a thread pool.

16. The method of claim 11 further comprising:

enabling the activity object in response to adding the reference to the operation segment in the queue structure of the context memory, enabling the activity object corresponds to retrieving a thread from a thread pool.

17. The method of claim 11 further comprising:

responding to the request upon execution of all operation segments of the request.

18. The method of claim 17 further comprising:

releasing the context memory for use by a second request.

* * * * *